F. P. MILLER.
ICE CREAM MACHINE.
APPLICATION FILED APR. 8, 1909.
970,846.
Patented Sept. 20, 1910.
3 SHEETS—SHEET 3.
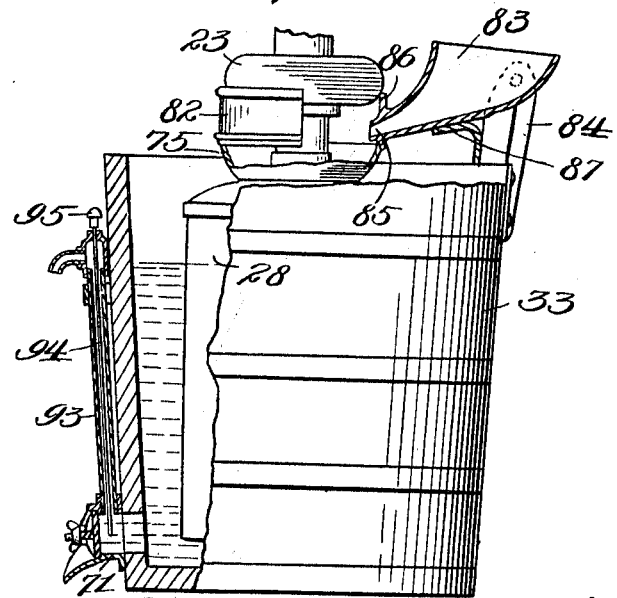
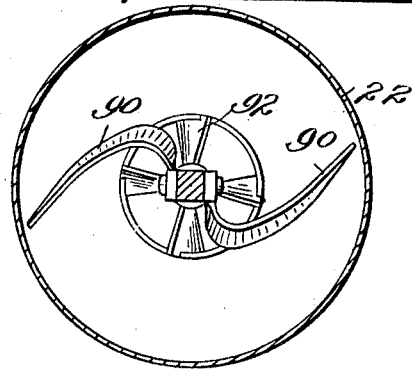
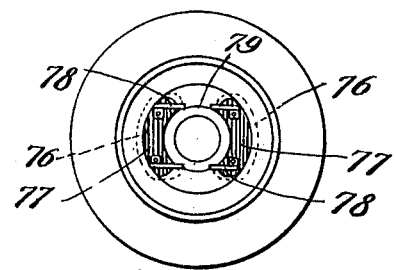
Witnesses:
Inventor
Franklin P. Miller
By
James L. Norris
Atty.
THE NORRIS PETERS CO., WASHINGTON, D. C.

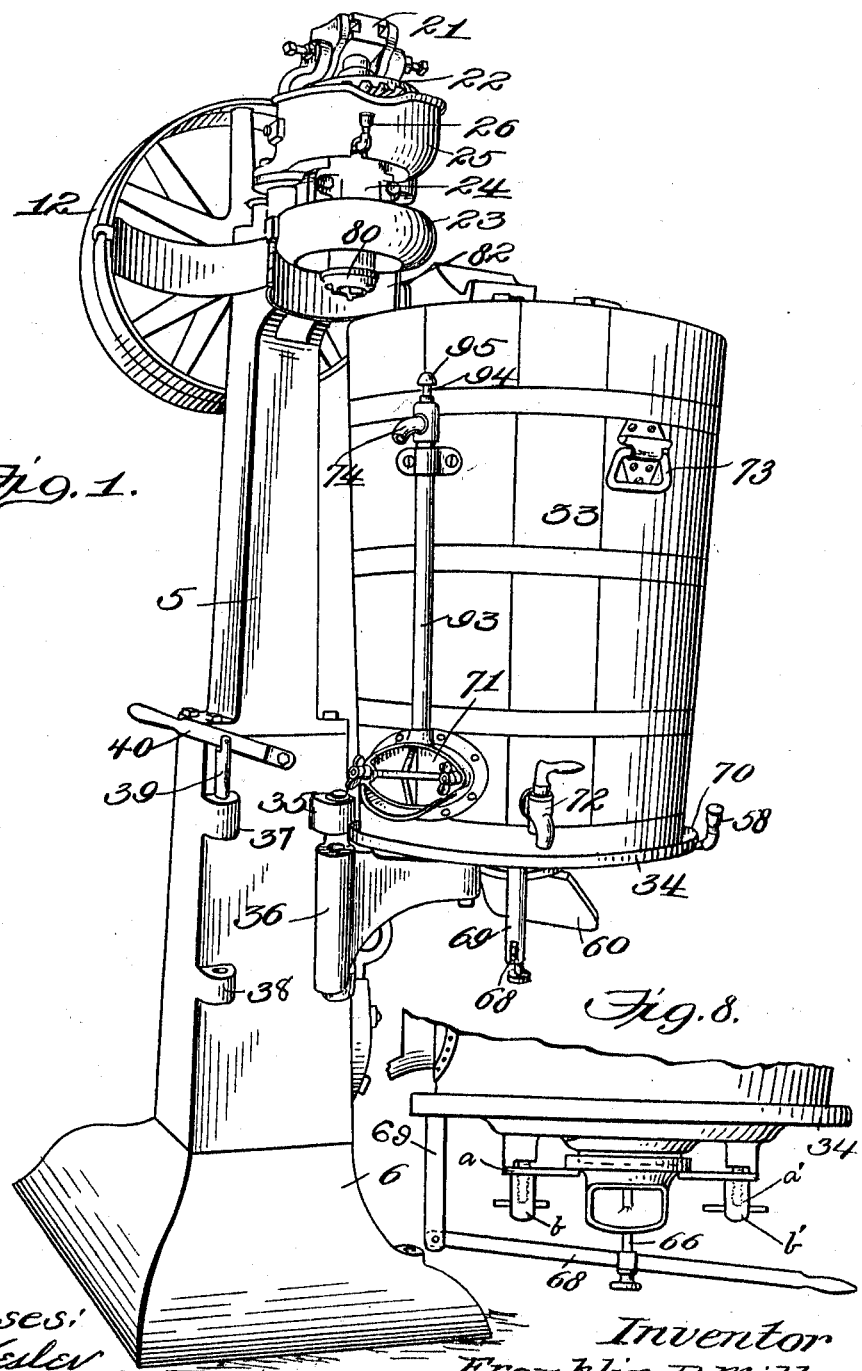

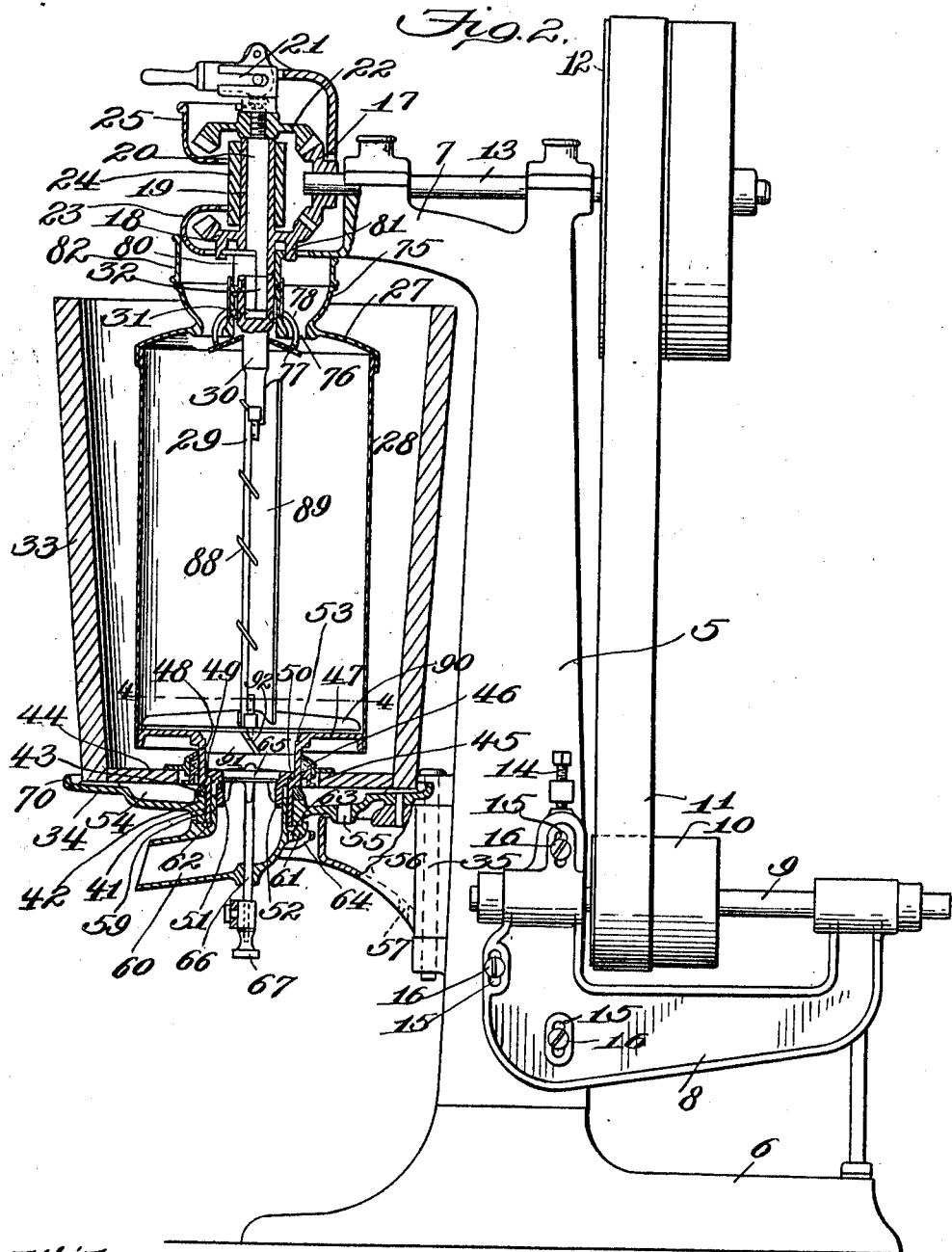

UNITED STATES PATENT OFFICE.

FRANKLIN P. MILLER, OF BLOOMFIELD, NEW JERSEY.

ICE-CREAM MACHINE.

970,846.  Specification of Letters Patent.  Patented Sept. 20, 1910.

Application filed April 8, 1909. Serial No. 488,778.

*To all whom it may concern:*

Be it known that I, FRANKLIN P. MILLER, a citizen of the United States, residing at Bloomfield, in the county of Essex and State of New Jersey, have invented new and useful Improvements in Ice-Cream Machines, of which the following is a specification.

This invention relates to a machine for making ice cream and the like of that type in which the cream or other material is frozen in a cylinder or can disposed in a containing receptacle or tub and surrounded by a suitable freezing mixture, such as ice and salt.
The objects of the invention are to provide a machine for making ice cream and other frozen material having a swinging tub or receptacle in which the freezing cylinder or can is mounted to facilitate removal and application of the can when desired; to provide means for releasing the frozen cream or other material from the bottom of the can and tub without requiring an operator to introduce his hand into the can for this purpose; to economize in the use of the refrigerating medium and particularly in ice and salt when the latter is used and the cold brine that is usually thrown away in machines of this type now commonly employed, and to generally increase the efficiency and structural advantages of machines of this class so as to render them convenient in operation and commercially valuable by reducing the cost of manufacturing ice cream and like frozen materials.

With these and other objects and advantages in view, the invention consists in the construction and arrangement of the several parts which will be more fully hereinafter specified in preferred form.

In the accompanying drawings, one embodiment of the invention is disclosed to demonstrate the practicability of the invention, but it will be understood that such changes as fairly fall within the scope of the invention will be adopted at will.

In the drawings: Figure 1 is a perspective view of a machine embodying the features of the invention and showing the tub or containing receptacle for the cylinder or can turned to one side. Fig. 2 is a side elevation of the machine partially in section. Fig. 3 is a side elevation of the tub broken away and illustrating the can therein and feeding devices coöperating with the upper part or top of the can or freezing cylinder, a portion of these devices being in section. Fig. 4 is a horizontal section, taken on the line 4—4, Fig. 2. Fig. 5 is a detail plan view of the cover for the can or cylinder. Fig. 6 is a detail perspective view of one of the diametrically operating closures for the cover of the can or cylinder. Fig. 7 is a detail perspective view of the outlet feeding devices coöperating with the bottom of the can. Fig. 8 is a detail elevation of the lower extremity of the containing receptacle or tub and particularly showing the means for holding the outlet nozzle and the valve operating lever.

The numeral 5 designates a vertical column rising from a base 6 and having an upper laterally projecting bearing arm 7 and a lower bearing element 8 which is vertically adjustable or capable of vertical movement for a purpose which will be presently explained. In the bearing element a drive shaft 9 is mounted and adapted to be actuated from a suitable source of power and carries suitable pulley means 10 over which is trained a belt 11 also engaging a pulley 12 on a power transmitting shaft 13 supported by the bearing arm 7 and the upper extremity of the column 5. It will be understood that any suitable and well known belt shifting means may be used in association with the belt 11 to control the operation of the mechanism, it being deemed unnecessary to illustrate these devices as they will be readily understood by anyone skilled in the art. By adjusting the bearing element 8 through the medium of the screw 14 engaging the upper portion thereof as shown, and the slots and headed studs 15 and 16, the belt 11 may be tightened to take up slack and insure a positive transmission of power from the shaft 9 to the shaft 13. On the shaft 13 a bevel pinion 17 is secured and held in continual mesh with a similar pinion 18 disposed in a plane at right angles thereto and fast to a sleeve 19 in which a vertical coupling shaft 20 is free to rotate and has vertical adjustment or shifting movement through the medium of a cam head and coöperating devices 21. The bevel pinion 17 is also adapted to mesh with a similar pinion 22 disposed in reverse position to the pinion 18 and fixed to the upper portion of the shaft 20. The pinions 18 and 22 and the remaining mechanism coöperating therewith are inclosed as far as practicable by suitable shelves or casings 23, 24 and 25, lubricant being supplied to the moving parts by an exterior oil cup 26 having communication by suitable means with the bearings of said movable parts. The sleeve 19 is connected to the cover 27 of the can or cylinder 28. Within the can or cylinder 28 a rotatable dasher or mixer 29 is mounted and has the upper extremity of its spindle 30 freely projecting through the center of the cover 27 and formed with a socket 31 to receive the lower angularly shaped end 32 of the coupling shaft 20. Through the medium of the pinions 17, 18 and 22, the can or cylinder 28 and the dasher 29 are rotated in opposite directions and the shaft 20 may be separated from the dasher by shifting the same vertically to facilitate removal of the said can or cylinder from a containing receptacle or tub 33 and the withdrawal of the dasher from the can or receptacle. This particular driving mechanism for the shaft 20 and the dasher and the sleeve 19 and can cover and can is fully explained in my co-pending application Serial Number 350,977, filed January 5, 1907, and need not be herein more fully explained. The tubular inclosure 24 forms an upright bearing for the sleeve 19, and the latter serves as a bearing for the coupling shaft 20.

In the present construction the containing receptacle or tub 33 is supported on a swinging table 34 hinged as at 35 to the column 5 and provided also with a locking socket 36 which is movable between apertured bosses 37 and 38, the boss 37 having a vertical slide bolt or rod 39 disposed therein and operated by a hand-lever 40 for engagement with or withdrawal from the socket 36. When the locking bolt or rod 39 engages the socket, the containing receptacle or tub 33 and the can or cylinder 28 with its cover 27 will be held in proper alinement under the mechanism for rotating the can and dasher, as hereinbefore explained, and also in coöperative relation with other parts which will be more fully hereinafter explained.

The swinging table 34 is formed with a central opening 41, the material of the table around the opening being thickened to provide a bearing collar 42 which projects above and below the remaining portion of the said table, and on the upwardly projecting part of this bearing collar a thrust ring 43 is disposed. The containing receptacle or tub 33 has its bottom 44 suitably held on the swinging table 34 and is formed with a central opening 45 in which is mounted a stuffing box 46. The bottom 47 of the can or cylinder 28 is provided with a depending outlet neck 48 which is offset on its outer side as at 49 to bear on the thrust ring 43 and has an inner ledge 50 to support a valve seat 51, the latter having a depending tubular member 52 parallel with and spaced apart from the lower extremity of the outlet neck 48.

At its upper portion the outlet neck has an inner annular shoulder 53 to receive the outlet feeding device which will be more fully hereinafter explained. The outlet neck 48 extends downwardly through the openings 45 and 41 respectively formed in the tub bottom 44 and the table 34 and by introducing the stuffing box 46 in the opening 45 in close engagement with the upper portion of the outlet neck 48 leakage of the brine through the bottom 44 of the containing receptacle or tub is obstructed, and in the event that a slight leakage should ensue it will be deposited in a dished portion 54 of the table 34 and escape through an outlet 55 into a chamber 56 from which it may be drawn through a suitable opening 57 provided in the bottom of said chamber. The can neck 48 revolves with the can or cylinder 28 in the openings 45 and 41 and a lubricant is fed to the lower extremity of said neck by any suitable duct from an exterior oil cup 58, as shown by Fig. 1. The vertical extremity or head 59 of an outlet nozzle 60 is inserted and held between the lower extremity of the can neck 48 and the depending tubular member 52 of the valve seat 51, the lower extremity of said nozzle being deflected and directed downwardly to deliver the finished product therefrom into any suitable receptacle that may be placed thereunder. At the base of the upwardly projecting head 59 of the nozzle 60 is an annular flange 61 shaped to snugly fit against the depending portion of the collar 42 and having an annular channel 62 therein to receive any oil that may drip from the bearing for or the lower extremity of the outlet neck 48, the said drip being permitted to escape through an opening 63. The outlet nozzle 60 is separably held in applied position by suitable clamping devices 64 engaging the under side of the same and supported by an adjacent part of the machine, as for instance the vertical wall of the chamber 56. An upwardly opening valve 65 is associated with the valve seat 51 and has a depending stem 66 extending through the bottom of the outlet nozzle 60 and is provided with a lower head 67. Attached to the stem 66 adjacent to the head 67 is an operating lever 68 fulcrumed in a post 69 depending from the table 34 and by means of which the valve 65 may be raised and lowered to establish communication between the nozzle 60 and the outlet neck 48 of the can or cylinder 28. All of the parts just described and including the outlet neck 48, nozzle 60, valve 65, and the can or cylinder 28 may be separated from the containing receptacle or tub 33 and table 34 for convenience in cleaning the several parts, this operation being readily accomplished by releasing the clamps 64 and the head 67 on the lower extremity of the stem 66 and withdrawing the can or cylinder 28 upwardly through the top of the containing receptacle or tub 33. The table 34 has an edge guard flange 70 to prevent any drip that may fall thereon from running over or escaping from the outer portion of the table, and the body of the table as a whole has an inward inclination to direct the drip that may run off the outer side of the containing receptacle or tub inwardly toward the center of the said table and escape through the opening 55. In this particular construction it will be noted that the lubricating material will be prevented from working up and coming in contact with the ice cream or other material and the outlet nozzle 60 is so applied as to be entirely free of entrance thereinto of any of the brine or other contaminating material from the machine. The tub or containing receptacle 33 is also provided with a hand-hole 71 to clean the same and remove ice therefrom, the said hand-hole having a suitable removable cover. Adjacent to the hand-hole the tub or receptacle is also provided with a drain cock 72 for drawing off brine from the tub without removing the hand-hole cover. The upper part of the tub is also provided with suitable handles or grips 73 and an inlet 74 which may also serve as an outlet means for liquid at the upper part of the tub.

The can cover 27 is provided with a bowl or hopper 75 and within the confines of the bowl the said cover has diametrically opposed inlets 76 with which centrifugally operated closures 77 are associated, said closures being applied to the inner side of the cover and having arcuate arms 78 hinged to a collar 79 rising from the central portion of the cover, as clearly shown by Fig. 5. These closures 77 are normally open and as the can rotates they are closed by centrifugal action. The collar 79 permits the upper extremity of the dasher spindle 30 to project therethrough for separable engagement with the lower extremity of the coupling shaft 20, and between the pinion 18 and the said collar 79 a clutch 80 is interposed and engages the said collar, this clutch being rotated with the pinion 18 by lugs 81 depending from the pinion and engaging the upper part of the clutch. This clutch is free to have vertical movement and is raised by hand to release the can when the can and dasher are detached from their driving parts. Above the bowl or hopper 75 a guard 82 is disposed to prevent ice and salt or other refrigerating material from getting into the can. This guard is made in two sections, one of the sections being fixed and the other hinged so that the hinged section may be thrown outward to allow access to the clutch 80 when it is necessary to unlock said clutch and permit the table 34 to be swung on its pivot to throw the tub as well as the can and dasher outwardly from beneath the driving mechanism therefor and after the locking means for the table has been released therefrom. On the upper portion of the tub is a cream feeder 83 hinged between uprights 84 so that it may be thrown outwardly and converged toward a constricted outlet nozzle 85 which extends through the guard and will preferably have a flange 86 covering that portion of the guard through which it projects. This feeder has cream or other material poured thereinto and from the nozzle 85 said cream or other material falls into the bowl 75 against the closures, and the cream or other material cannot enter the can or cylinder 28 any faster than the closures 77 will permit, but it is obvious that if the weight of the cream or other material and the closures is sufficient to overcome a reduced centrifugal action, the said closures will open, the closures by their weight gravitating and standing normally open, as hereinbefore explained. The feeder 83 is held in proper feeding position by a rest 87 projecting inwardly from the uprights 84, as clearly shown by Fig. 3. By means of this feeder the can 28 may be regularly supplied with the material to be frozen as the completed product is withdrawn or removed from the bottom of the can and tub, as will be more fully hereinafter specified.

The dasher 29 in addition to angularly disposed agitating blades 88 has side scraping blades 89 to engage the inner surface of the wall of the can body, and at the lower extremity of the dasher are two screw blades 90, see Fig. 4, which fully sweep the bottom of the can and are shaped in such manner as to draw the frozen cream or other material toward the outlet neck 48 depending from the bottom 47 of the can, and the delivery of the frozen cream or other material from the bottom portion of the can is facilitated by an outlet feeding device 91 in which the lower end of the dasher spindle is fitted to rotate and having inclined shouldered blades 92 bearing on the annular shoulder 53 at the inner portion of the upper part of the neck 48, the frozen cream or other material being deposited by this outlet feeding device on the valve 65, and when the latter is opened through the medium of the stem 66 and lever 68 the frozen cream or other material passes downwardly into and out from the spout 60, the valve 65 being held open any length of time found necessary or desirable to relieve the can 28 of a frozen charge and which charge may be expeditiously withdrawn from the bottom without contamination or without requiring an operator to directly handle the same, with advantages from a standpoint of cleanliness and expedition in making frozen products of this character. It will also be understood that from time to time the refrigerating material within the tub or containing receptacle 33 will be replenished, and in the event that the ice in the tub melts very rapidly the excess of brine may be carried away by the outlet pipe 93 which will serve principally as an overflow means and to this overflow medium any suitable tubular connection may be attached.

The hook-shaped or screw blades 90 will be found very efficient in their operation, particularly in conjunction with the outlet feeding device 91 and the mechanism as a whole embodying the features of the invention will facilitate the production of frozen material such as ice cream at a reduced cost.

The coldest part of the tub 33 is at the top, the brine absorbing heat as it flows to the bottom of said tub. The surplus liquid should, therefore, be removed from the bottom of the tub, and for this purpose a pipe 93 is connected to the body of the hand-hole 71, see Figs. 1 and 3, and extends upwardly and is attached to the outlet 74. By this means the warmer liquid is drawn away from the bottom of the tub, the said liquid rising in the pipe 93 and escaping through the said outlet. Within the pipe 93 is a freely reciprocable rod 94 having an upper handle 95 to keep the pipe clear. This rod 94 may remain in the pipe 93 during the freezing operation, or be removed, as desired.

What is claimed is:

1. In an ice cream freezing machine or the like, the combination with a receptacle for the freezing material, a rotary freezing cylinder arranged therein, the cylinder having a bottom outlet, a dasher in the cylinder having a rotation imparted thereto in a direction reverse to that of the cylinder, and a swinging supporting means for the receptacle and cylinder and having means to separably engage the bottom outlet.

2. In an ice cream freezing machine or the like, the combination of a containing receptacle for the freezing material, a cylinder for the material to be frozen provided with a bottom outlet, a dasher disposed in the cylinder, the cylinder and dasher being rotated in reverse directions, mechanism for operating the cylinder and dasher, and a supporting table carrying the said receptacle and cylinder and having means to separably engage the bottom outlet.

3 In an ice cream freezing machine, the combination of a receptacle for the freezing material, a rotary receptacle for the material to be frozen arranged therein, a rotary shaft arranged vertically in the last named receptacle and carrying blades, the bottom of the receptacle for the freezing material having a bottom outlet means with which the outlet opening of the receptacle for the material to be frozen communicates, means for operating the shaft and said rotary receptacle, gathering devices operated by the shaft and moving over the bottom of the rotary receptacle to draw the frozen material toward the outlet opening, an outlet feeding device supporting the shaft and located in the outlet opening of the rotary receptacle, and an exteriorly operative valve located in the bottom outlet of the receptacle for the freezing material for controlling the exit of the frozen material from both receptacles.

4. In a machine for freezing ice cream and the like, the combination of a containing receptacle for refrigerating material, a can rotatably mounted in the said receptacle and having an outlet neck extending through the bottom of the latter, a dasher mounted in the can, means for rotating the dasher and can in reverse directions, means in the bottom of the can and in the neck for ejecting the frozen material from the can, and an outlet spout coöperating with the neck and having a valve located in the neck above the spout to open and close communication between the neck and spout, the containing receptacle and can being separable from the valve.

5. In a machine for freezing ice cream and the like, the combination of a containing receptacle for refrigerating material, a can rotatably mounted in said receptacle and having a bottom outlet neck extending through the bottom of said receptacle, a dasher mounted in the can and provided with blades of hook shape traveling close to the bottom of the can to draw the frozen material into the neck, a device engaged by said shaft and located in the neck to cause the frozen material to be fed downwardly, means for rotating the dasher and can in reverse directions, and an upwardly movable valve for opening and closing the outlet neck and supported in separable relation to the receptacle and can.

6. In a machine for freezing ice cream and the like, the combination of a containing receptacle for refrigerating material, a can rotatably mounted in said receptacle and having a bottom outlet neck extending through the bottom of said receptacle, a dasher mounted in the can and provided with blades at its lower extremity moving closely over the bottom of the can to draw the frozen material into the neck, a device for causing the frozen material to be fed downawardly and engaged by the shaft and located in the neck close to said blades, and means for opening and closing the neck and supported in separable relation to the receptacle and can and structurally independent of the latter.

7. In a machine for freezing ice cream and the like, the combination of a containing receptacle for refrigerating material having an opening through the bottom thereof, a stuffing box in said opening, a can rotatably mounted in said receptacle and having a bottom outlet neck extending through the stuffing box, a dasher mounted in the can and provided with blades traveling close to the bottom of the can to draw the frozen material into the neck, means for rotating the dasher and can, and means structurally independent of the receptacle and can for opening and closing the said neck.

8. In a machine for freezing ice cream and the like, a table having a central opening with a thrust ring thereon, a containing receptacle for refrigerating material held on the table, a can rotatably mounted in said receptacle and having a bottom outlet neck extending through the bottom of said receptacle and bearing on the thrust ring, a valve seat in the neck, an outlet spout having a head portion held between a part of the valve seat and neck an upwardly movable and separable valve engaging the said seat and provided with a stem projecting downwardly through the outlet spout for exterior operation, a stuffing box in the opening in the bottom of the containing receptacle and engaged by the said neck, a dasher in the can having means coöperating with the lower extremity thereof within the can and neck for feeding the frozen material to and through the neck, and means for operating the dasher and can.

9. In a machine for freezing ice cream and the like, the combination of a containing receptacle for refrigerating material, a can rotatably mounted in said receptacle and having a bottom outlet and a cover provided with a bowl, the cover also having openings therein within the confines of the bowl, closures coöperating with the said openings of the cover and normally held open by their weight and closed by centrifugal action, a dasher within the can, and feeding means coöperating with the bowl and held by the containing receptacle.

10. In a machine for freezing ice cream and the like, the combination of a containing receptacle for refrigerating material, a can rotatably mounted in said receptacle and having a bottom outlet and a cover provided with a bowl, openings being formed in the cover within the confines of the bowl, automatically operating closures for the said openings, a sectional guard coöperating with the upper portion of the bowl, a dasher in the can, mechanism for operating the can and dasher, and means for separating the operating mechanism from the can and dasher.

11. In a machine for freezing ice cream and the like, the combination of a containing receptacle for refrigerating material having upper and lower outlet means, a rotary freezing can in said receptacle and a pipe connecting the upper and lower outlet means whereby the warmer liquid will be released from the lower part of the receptacle.

12. In a machine for freezing ice cream and the like, the combination of a containing receptacle for refrigerating material having upper and lower outlet means, a rotary freezing can in said receptacle, a pipe connecting the upper and lower outlet means whereby the warmer liquid will be released from the lower part of the receptacle, and a rod movably and removably disposed in the said pipe.

13. In a machine for freezing ice cream and the like, a table having a surrounding guard flange and inclined inwardly toward the center to a dished portion provided with an outlet, a discharge neck held by the central portion of and depending below the table, means for supporting the table at one side of its center, and a containing device separably mounted on the table and adapted to hold freezing mixture, the table receiving the drip from the containing device.

14. In a machine for freezing ice cream and the like, a table having a surrounding guard flange and inclined inwardly toward the center and provided with a drainage outlet, means for holding the table in suspended position and located at one side of the center of said table, and a containing receptacle removably held on the table and adapted to contain freezing material.

In testimony whereof I have hereunto set my hand in presence of subscribing witnesses.

FRANKLIN P. MILLER.

Witnesses:
JOHN M. RHODABECK,
E. M. PELOUBET,
FREDERICK KEYLER.